(12) United States Patent
Tomita et al.

(10) Patent No.: US 9,586,230 B2
(45) Date of Patent: Mar. 7, 2017

(54) METHOD OF COATING LUBRICATION PAINT ON DISK-SHAPED SUBSTRATE

(71) Applicant: Sanden Corporation, Isesaki-shi, Gunma (JP)

(72) Inventors: Takeo Tomita, Isesaki (JP); Norio Taniyama, Isesaki (JP); Hiromitsu Shishido, Isesaki (JP); Satoshi Ando, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

(21) Appl. No.: 14/430,160

(22) PCT Filed: Oct. 11, 2012

(86) PCT No.: PCT/JP2012/076369
§ 371 (c)(1),
(2) Date: Mar. 20, 2015

(87) PCT Pub. No.: WO2014/057568
PCT Pub. Date: Apr. 17, 2014

(65) Prior Publication Data
US 2015/0239008 A1  Aug. 27, 2015

(51) Int. Cl.
| | |
|---|---|
| *B05D 1/40* | (2006.01) |
| *B05D 5/00* | (2006.01) |
| *B05D 1/42* | (2006.01) |
| *B05D 3/12* | (2006.01) |
| *B05D 1/02* | (2006.01) |
| *F04B 1/00* | (2006.01) |
| *F04B 27/00* | (2006.01) |
| *F16H 61/00* | (2006.01) |
| *B05D 1/00* | (2006.01) |

(52) U.S. Cl.
CPC .............. *B05D 1/42* (2013.01); *B05D 1/002* (2013.01); *B05D 1/02* (2013.01); *B05D 3/12* (2013.01); *F04B 1/00* (2013.01); *F04B 27/00* (2013.01); *F16H 61/00* (2013.01); *B05D 2202/00* (2013.01); *B05D 2202/15* (2013.01); *B05D 2202/45* (2013.01)

(58) Field of Classification Search
CPC . B05D 1/002; B05D 1/02; B05D 1/42; B05D 3/12; B05D 2202/00; B05D 2202/10; B05D 2202/45
USPC ...................... 427/286, 356, 358, 425, 427.4
See application file for complete search history.

(56) References Cited

U.S. PATENT DOCUMENTS

| | | | |
|---|---|---|---|
| 5,601,868 A | 2/1997 | Gerhardt | |
| 5,746,833 A | 5/1998 | Gerhardt | |
| 7,377,754 B2 | 5/2008 | Saiki et al. | |
| 2001/0015130 A1* | 8/2001 | Sugiura | ............... F04B 27/1054 92/71 |
| 2004/0221715 A1 | 11/2004 | Murase et al. | |
| 2013/0247699 A1 | 9/2013 | Nomura et al. | |

FOREIGN PATENT DOCUMENTS

| | | |
|---|---|---|
| DE | 4433048 A1 | 3/1996 |
| EP | 1079110 A2 | 2/2001 |
| JP | S62-202378 U | 12/1987 |
| JP | S63-62218 A | 3/1988 |
| JP | 6-23313 A | 2/1994 |
| JP | H07-289973 A | 11/1995 |
| JP | H10-261578 A | 9/1998 |
| JP | 10-334519 A * | 12/1998 |
| JP | H10-334519 A | 12/1998 |
| JP | 2001-132639 A | 5/2001 |
| JP | 2001-234860 A | 8/2001 |
| JP | 2004-323594 A | 11/2004 |
| JP | 2006-152274 A | 6/2006 |
| JP | 4025832 B | 12/2007 |
| WO | 2012/074107 A1 | 6/2012 |

OTHER PUBLICATIONS

Definition of "horizontal," as retrieved from http://www.oed.com on May 25, 2016, 8 pages.*
Fukata et al., "Lubricating Condition Between Swashplate and Shoe in Swashplate Compressor," International Compressor Engineering Conference at Perdue, Jul. 12-15, 2010, 9 pages.*
Hotta et al., "Measurement of Oil Film Between Swash Plate and Shoe for Swash Plate Type Compressor," International Compressor Engineering Conference at Perdue, Jul. 12-15, 2004, 9 pages.*
Zhang et al., "An Improved Tribological Polymer-Coating System for Metal Surfaces," Tribol. Lett. (2010) 38:355-365.*
English-language translation of Written Opinion of The International Searching Authority for PCT/JP2012/076369, Dec. 25, 2012, 6 pages.*
Japan Patent Office, International Search Report for Application No. PCT/JP2012/076369, mailed Dec. 25, 2012. (Counterpart to above-captioned patent application.)
German Patent and Trademark Office, Office Action issued in Application No. DE 11 2012 007 004.6, dated Aug. 11, 2016.
Japan Patent Office, Notification of Reasons for Refusal issued in Application No. JP 2014-540698, mailed Dec. 15, 2016.

* cited by examiner

*Primary Examiner* — William Phillip Fletcher, III
(74) *Attorney, Agent, or Firm* — Baker Botts L.L.P.

(57) ABSTRACT

A method for coating a lubrication paint on a disk-shaped substrate, comprising: applying the lubrication paint on a sliding portion of the disk-shaped substrate from a paint supply nozzle while rotating the disk-shaped substrate in the horizontal plane; and leveling the lubrication paint applied on the sliding portion by contacting the lubrication paint with a doctor knife that is arranged at a downstream position in the direction of rotation of the disk-shaped substrate. The disk-shaped substrate may be the swash plate of a swash plate compressor.

18 Claims, 4 Drawing Sheets

METHOD OF COATING LUBRICATION PAINT ON DISK-SHAPED SUBSTRATE

CROSS-REFERENCE TO RELATED APPLICATIONS

This application is a U.S. National Stage Patent Application under 37 U.S.C. §371 of International Patent Application No. PCT/JP2012/076369, filed on Oct. 11, 2012, the disclosure of which is incorporated herein by reference in entirety.

TECHNICAL FIELD

The present invention relates to a method of coating a lubrication paint on a disk-shaped substrate, and more particularly relates to a method of coating a lubrication paint on a disk-shaped substrate including a swash plate of a swash-plate compressor used in an air conditioner for a vehicle.

BACKGROUND ART

The swash-plate compressor includes a fixed displacement swash-plate compressor in which a swash plate is fixed directly to a driving shaft that is rotatably arranged in a housing so as to tilt against the driving shaft, and a variable displacement swash-plate compressor in which a swash plate is attached to a driving shaft through a connecting member so that a tilt angle is variable. Both of the swash-plate compressors make a shoe slide on the swash plate, convert a rotation of the swash plate into a reciprocating movement of a piston through the shoe and compress a coolant.

In these swash-plate compressors, as the swash plate slides along the shoe in an early stage of the operation before a lubricant contained in the coolant reaches the sliding portion, the sliding portion is made dry lubrication state without lubricant, and adhesion tends to occur. For this reason, one method known as one means for preventing adhesion is: coating a lubrication paint including a lubrication paint prepared by dispersing a solid lubricant such as polytetrafluoroethylene (PTFE) and graphite into an organic solvent solution of a polyamide imide resin (PAI) that is a thermosetting resin on the sliding portion of the swash plate followed by heating and curing of the paint film to finish the coating film for sliding see Patent Documents 1 and 2.

DOCUMENTS CITED

Patent Documents

Patent Document 1: Japanese Patent Laid-Open No. 2004-323594
Patent Document 2: Japanese Patent No. 4025832

SUMMARY OF THE INVENTION

Problems to be Solved

Although these methods include a spray coating method and a roll coating method as a method of coating the lubrication paint on a sliding portion of the swash plate, as the paint may be coated on portions other than the sliding portion of the swash plate, waste consumption of the paint causes the increase of a production cost of a product. In addition, if the coating film for sliding is provided even on the portions other than the sliding portion, a deviation in attachment precision occurs when the swash plate is attached. Accordingly, to prevent the deviation, the portions other than the sliding portion are generally masked to prevent the paint from coating on the portions other than the sliding portion when the paint is coated. However, as the masking operation is a time-consuming job, production efficiency decrease and the masking material increase a production cost of the product.

Means to Solve the Problem

The present invention is performed in view of the situations of the prior art described above, and an object of the present invention is to provide a coating method excluding a masking operation and can efficiently coat the paint just on a sliding portion when a lubrication paint is coated on a disk-shaped substrate such as a swash plate.

Specifically, a method of coating a lubrication paint according to the present invention employs a constitution characterized in that a lubrication paint is supplied on the sliding portion from a paint supply nozzle while rotating the disk-shaped substrate in a horizontal direction followed by leveling of the lubrication paint supplied on the sliding portion by a doctor knife at a downstream position in a rotating direction of the disk-shaped substrate.

Advantages of the Invention

As the coating method according to the present invention excludes a masking operation for preventing the paint from coating on portions other than a sliding portion of a disk-shaped substrate, the present method can efficiently coat the paint just on the sliding portion, and can form a paint film having an even film thickness over the entire area of the sliding portion appropriately.

DETAILED DESCRIPTION OF THE INVENTION

Figure 1:
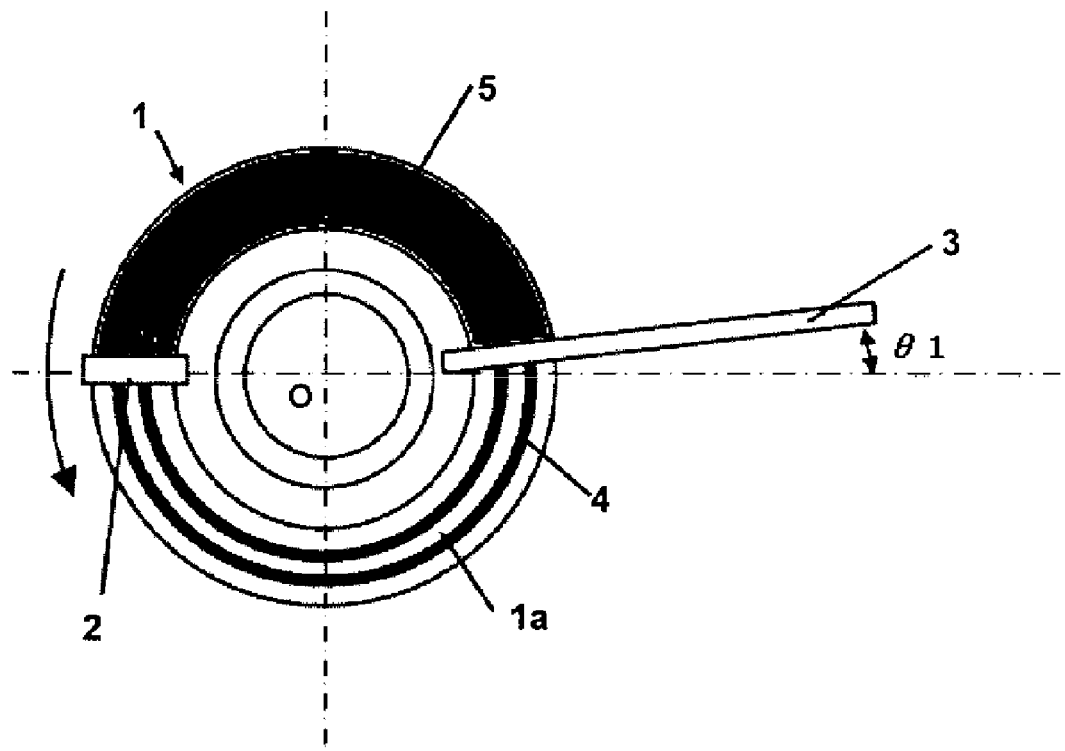
FIG. 1 is a schematic plane view demonstrating a step of coating a lubrication paint on a disk-shaped substrate.

Regarding the disk-shaped substrate used in the embodiment of the present invention, although the disc-shaped substrate is mainly made of an iron-based material or a copper-based material usually used as a material for a swash plate in a swash-plate compressor, the iron-based material is generally used. Note that, a lubrication paint used in the embodiment of the present invention is not limited in particular, and a popular material conventionally used as the lubrication paint for the swash plate can be used. A popular lubrication paint for the swash plate is produced by a process of dispersing a solid lubricant into an organic solvent solution of a thermosetting resin. Although the thermosetting resin may include at least one of a polyamide imide resin, a polyimide resin, a polyetherimide resin, a phenol resin, an epoxy resin and unsaturated polyester, a resin system which contains the polyamide imide resin as a main component is preferable. Although the solid lubricant may include at least one of polytetrafluoroethylene, molybdenum disulfide, tungsten disulfide, graphite, boron nitride, antimony oxide, lead oxide, lead, indium and tin, a material which contains the polytetrafluoroethylene (PTFE) as a main component and is blended with an appropriate amount of the graphite is preferable. If the material which contains polytetrafluoroethylene blended with the appropriate amount of the graphite as the solid lubricant and further contains the polyamide imide resin as the main component is used as the thermosetting resin, weight ratio of the solid lubricant and the thermosetting resin may be (20 to 60)/(40 to 80).

In FIG. 1 to FIG. 5, a disk-shaped substrate 1 is mounted horizontally on a rotating device (not shown), and is rotated in an arrow direction by the rotating device. A paint supply nozzle 2 is arranged in a predetermined height above a sliding portion 1a of the disk-shaped substrate 1, and the lubrication paint is sent to the paint supply nozzle 2 from a paint dispenser (not shown). In the paint coating step, one cycle finishes by the 360 degrees rotation of the disk-shaped substrate 1. If the position of the paint supply nozzle 2 is assumed to be a 0 degrees position, the doctor knife 3 is arranged at an approximate 180 degrees position. The lubrication paint is supplied from the nozzle 2 and is coated on the sliding portion 1a of the rotating disk-shaped substrate 1. The paint 4 supplied from the nozzle 2 reaches the doctor knife 3 while forming a bold line. The paint 4 is made level by the doctor knife 3, and the entire surface of the sliding portion 1a is covered with the paint film 5 made level by the doctor knife 3. After finishing one cycle of the coating step, the supply of the paint from the nozzle 2 on the disk-shaped substrate 1 stop, and the doctor knife 3 moves to a predetermined stand-by position and stands by at the position. In the coating step, the doctor knife 3 is arranged at predetermined angles θ(theta)1, θ(theta)2 and θ(theta)3 described later against the surface of the disk-shaped substrate 1. The disk-shaped substrate 1 of which the sliding portion 1a is covered with the level paint film 5 is heated in a heating furnace at a temperature of 200 deg.-C. to 250 deg.-C. for 30 to 60 minutes for heating and curing of the paint film 5. After heating, the heated and cured paint film on the disk-shaped substrate 1 is polished by a polishing machine, and a surface roughness is adjusted to be a predetermined value.

In the coating method according to the present invention, it is preferable to adjust the angle of the doctor knife 3 against the disk-shaped substrate 1, the direction and the speed of the doctor knife 3 in moving away from the disk-shaped substrate 1, the position of the paint supply nozzle, the inner diameter of the paint supply nozzle, the viscosity of the paint and the amount of the paint to be supplied on the sliding portion as described later.

[Angle θ(Theta)1 of the Doctor Knife 3 Against the Disk-Shaped Substrate 1]

Figure 2:
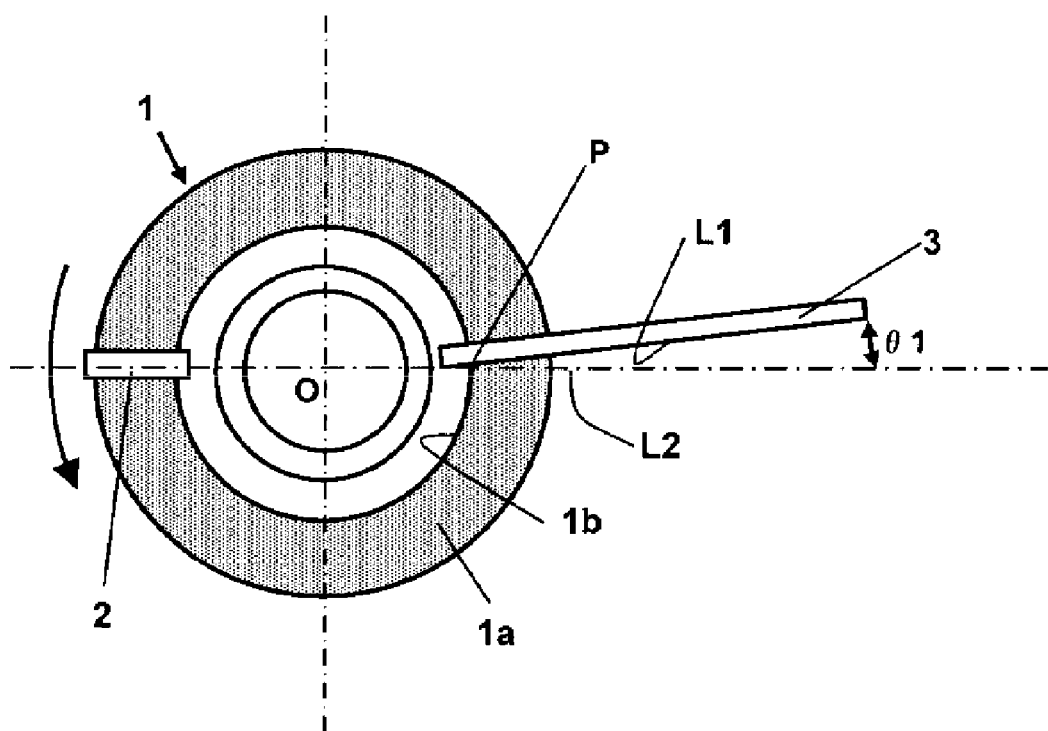
FIG. 2 is a schematic plane view demonstrating an angle θ(theta)1 of a doctor knife against the disk-shaped substrate in the coating step.
Figure 4:
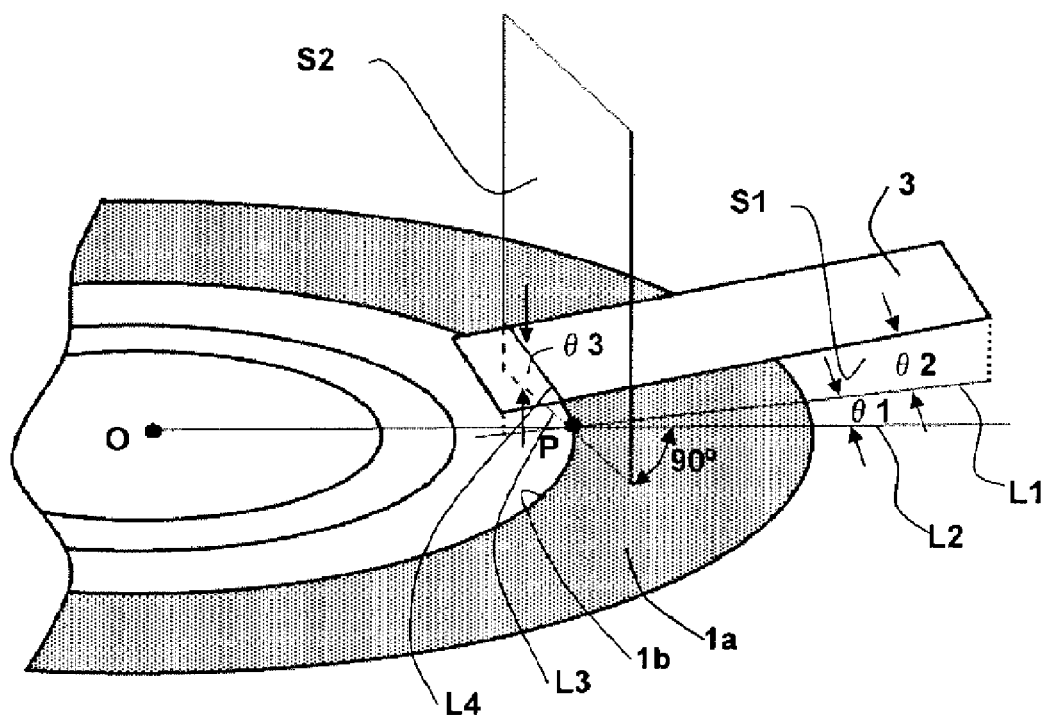
FIG. 4 is a schematic perspective view demonstrating the angles θ(theta)1, θ(theta)2 and θ(theta)3 of the doctor knife against the disk-shaped substrate in the coating step.
Figure 5:
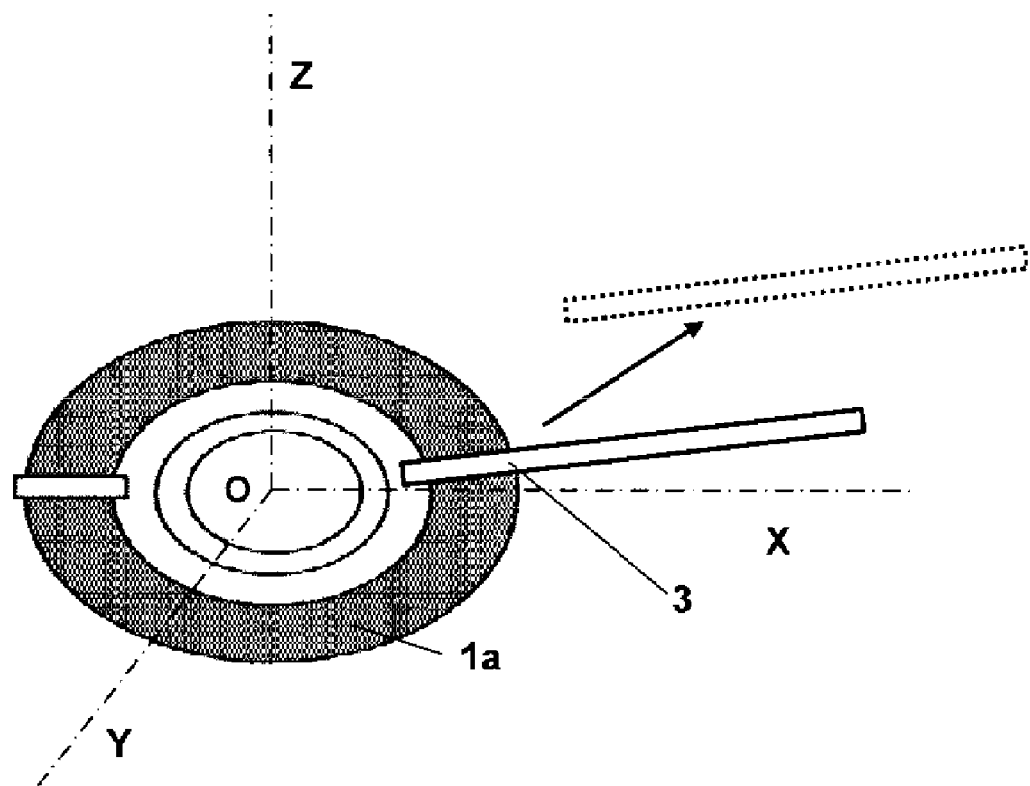
FIG. 5 is a schematic perspective view demonstrating the moving away of the doctor knife from the disk-shaped substrate at finishing of the coating step.

The doctor knife 3 is arranged in a position higher than the surface of the disk-shaped substrate 1 by a thickness of the paint film to be provided, and the tip shape of the doctor knife 3 is linear. In FIG. 2 and FIG. 4, if a line which intersects a plane including an edge line of the doctor knife and is perpendicular to the surface of the disk-shaped substrate and a surface of the disk-shaped substrate is defined as the straight line L1, and a straight line which connects a center point O of the disk-shaped substrate and a point P where an inner edge of the sliding portion of the disk-shaped substrate cross the straight line L1 is defined as the straight line L2, the angle θ(theta)1 formed by the straight line L1 and the straight line L2 is −1 degrees to +15 degrees. Note that, an angle of minus (−) means an angle if the straight line L1 is at an upstream side of a rotation of the disk-shaped substrate from the straight line L2, and an angle of plus (+) means an angle if the straight line L1 is at a downstream side of the rotation of the disk-shaped substrate from the straight line L2. If the viscosity of the paint is low, the paint may flows to the outer edge due to a centrifugal force generated by the rotation of the disk-shaped substrate 1, and if the angle θ(theta)1 of the doctor knife 3 is 0 degrees, the paint is affected by the doctor knife 3 and may flows toward the center of the disk-shaped substrate 1. So, it is preferable to appropriately adjust the angle θ(theta)1 of the doctor knife 3 within the angle described above in view of the viscosity of the paint.

[Angle θ(Theta)2 of the Doctor Knife 3 Against the Disk-Shaped Substrate 1]

Figure 3:
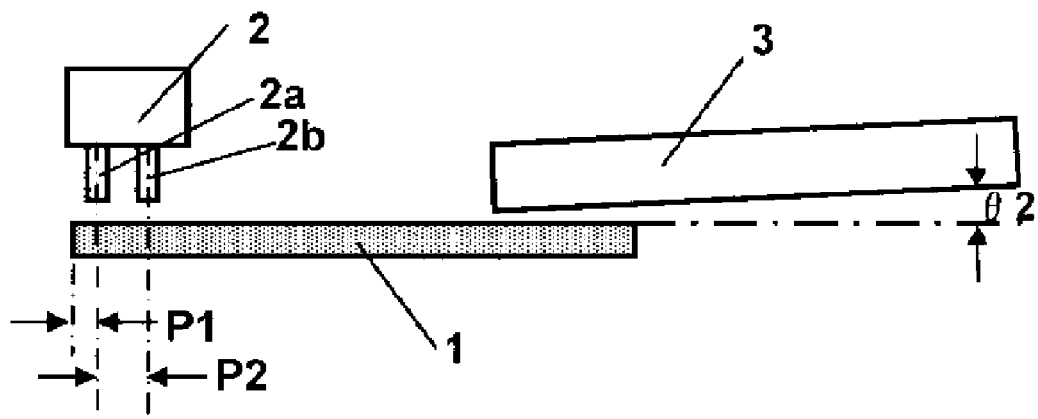
FIG. 3 is a schematic front view demonstrating an angle θ(theta)2 of the doctor knife against the disk-shaped substrate and arrangement of a paint supply nozzle in the coating step.

In FIG. 3 and FIG. 4, the vertical angle θ(theta)2 of the edge line of the doctor knife 3 against the surface of the disk-shaped substrate 1 is preferable to be −1 degree to +1 degree. Note that, an angle of minus (−) means that the edge line of the doctor knife 3 has downward tilt from inside to outside of the disk-shaped substrate 1, and an angle of plus (+) means that the edge line of the doctor knife 3 has upward tilt from inside to outside of the disk-shaped substrate 1. The thickness of the paint film may be thick in the outside of the sliding portion or may be thick in the inside due to the influence of the viscosity of the paint. So, it is preferable to appropriately adjust the vertical angle θ(theta)2 of the doctor knife in the angle range described above in view of the viscosity of the paint.

[Angle θ(Theta)3 of the Doctor Knife 3 Against the Disk-Shaped Substrate 1]

The doctor knife 3 is arranged to tilt against the disk-shaped substrate 1 so as to incline toward the downstream side in the rotating direction. In FIG. 4, if a straight line on the surface of the disk-shaped substrate 1 which passes the point P where the inner edge of the sliding portion of the disk-shaped substrate cross with the straight line L1 and perpendicular to the straight line L2 is defined as the straight line L3, and a line intersecting a plane which includes the straight line L3 and is perpendicular to the disk-shaped substrate 1 and a plane of the doctor knife 3 is defined as the straight line L4, an angle θ(theta)3 formed by the straight line L3 and the straight line L4 is 25 degrees to 85 degrees. If the angle θ(theta)3 of the doctor knife 3 is adjusted in this angle range, an approximate constant amount of the paint can be always accumulated and left on the surface of the doctor knife 3, and the left paint can be supplied on the disk-shaped substrate 1 in the next cycle. Thereby, the paint 4 can be stably made level in continuous cycles.

[Direction and Speed of the Doctor Knife 3 in Moving Away]

After finishing one cycle of the coating step, the driver (not shown) moves away the doctor knife 3 from the position where the doctor knife is arranged in coating. In the moving away, the doctor knife 3 moves away at a predetermined speed toward each of directions of an upper direction, an outside direction and a frontward direction (upstream direction of rotation of disk-shaped substrate 1) from the position where the doctor knife is arranged in coating to a predetermined stand-by position for the next cycle and stops. That is, in FIG. 5, the doctor knife 3 moves away at a predetermined speed toward XYZ directions from the position where the doctor knife is arranged in coating. The moving away speed of the doctor knife 3 is preferable to be 0.1 to 10 mm/second toward each of the axis. In addition, the rotation of the disk-shaped substrate 1 in moving away of the doctor knife 3 is preferable to be 10 to 200 rpm. Appropriately adjusted moving away speed of the doctor knife 3 and rotation of the disk-shaped substrate 1 in the range described above can prevent that the evenness of the coated surface is deteriorated and the paint accumulated on the doctor knife 3 drips due to the influence of the moving away of the doctor knife 3.

[Position of the Paint Supply Nozzle 2 and Inner Diameter of the Nozzle]

In FIG. 3, two paint supply nozzles 2a and 2b are arranged along a radial direction. The position P1 of the outer nozzle 2a is preferable to be 0.5 to 6 mm from the outer edge of the disk-shaped substrate 1 with a pitch P2 between the outer nozzle 2a and the inner nozzle 2b of 0.5 to 5 mm. In addition, the inner diameter of the paint supply nozzle 2 is preferable to be 0.3 to 4 mm.

[Viscosity of the Paint]

The viscosity of the paint is preferable to be 1,000 to 30,000 mPa·s/25° C., and is most preferable to be 5,000 to 12,000 mPa·s/25° C. Note that, the viscosity of the paint is a viscosity measured by using a rotational Brookfield type viscometer. If the viscosity of the paint is adjusted in this range, the deviation in the thickness of the paint film due to the influence of the doctor knife and the centrifugal force can be reduced to the minimum, and miss-coating of the paint on portions other than the sliding portion 1a can be prevented.

[Coating Amount]

The coating amount of the paint on the sliding portion 1a of the disk-shaped substrate 1 is preferable to be 0.006 to 0.038 g/cm$^2$ as per unit area of the sliding portion 1a, and is most preferable to be 0.012 to 0.026 g/cm2. If both the amount of the paint supplied on the sliding portion 1a of the disk-shaped substrate 1 from the paint supply nozzle 2 and the rotation of the disk-shaped substrate 1 are appropriately adjusted, the amount of the paint coated on the sliding portion 1a can be adjusted in the range described above.

[Swash-Plate Compressor]

The paint film of the lubrication paint provided on the disk-shaped substrate 1 by the coating method described above is heated and cured in a heating furnace, then the cured paint film is polished by the polishing machine, and the surface roughness is adjusted to a predetermined value. One example of the swash-plate compressor will be described below which uses the disk-shaped substrate 1 provided with the lubrication paint film thus formed as the swash plate.

Figure 6:
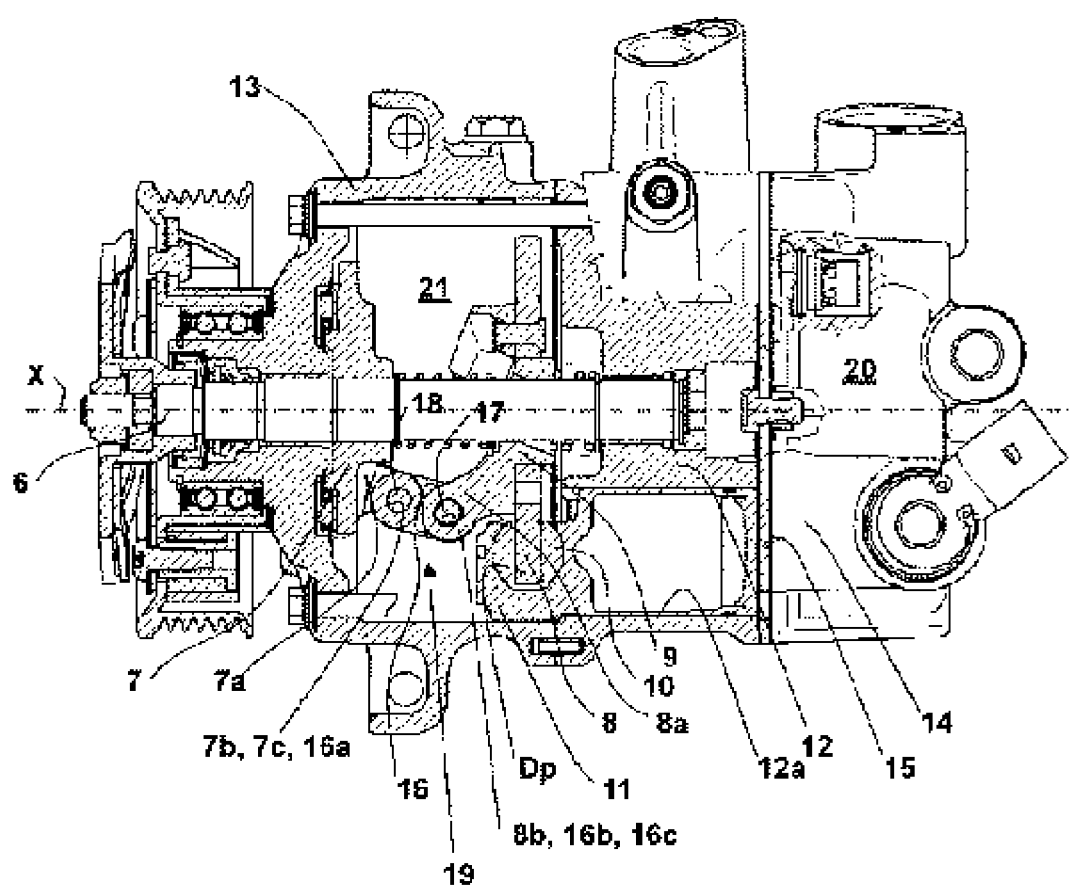
FIG. 6 is a cross-sectional view demonstrating the structure of a swash-plate compressor.

The variable displacement swash-plate compressor shown in FIG. 6 is provided with: the driving shaft 6; the rotor 7 fixed to the driving shaft 6; and the swash plate 8 slidably supported by the driving shaft 6 and the tilting angle can vary. The swash plate 8 includes the disk-shaped substrate 1 and the boss 9 of the swash plate, and the disk-shaped substrate 1 is fixed to the boss 9 of the swash plate by a rivet. The piston 11 equipped to the swash plate 8 through a pair of shoes 10 that sandwich the peripheral portion of the swash plate 8 is slidably inserted into a cylinder bore 12a that is formed in a cylinder block 12. The driving shaft 6, the rotor 7 and the swash plate 8 are housed in a front housing 13. An ejection chamber and an introduction chamber are formed in the cylinder head 14. The valve plate 15 is sandwiched by the cylinder block 12 and the cylinder head 14. The cylinder block 12, the front housing 13, the cylinder head 14 and the valve plate 15 are integrally assembled. The driving shaft 6 is rotatably supported by the front housing 13 and the cylinder block 12.

Circular through holes 7b and 7c are formed in a pair of rotor arms 7a which extend toward the swash plate 8 from the rotor 7. The circular through holes 7b and 7c are perpendicular to a plane formed by a central axis line X of the driving shaft 6 and a top dead center Dp of the swash plate 8, and coaxially extend. The circular through hole 8b is formed in a single swash plate arm 8a which extends toward the rotor 7 from the swash plate 8. The circular through hole 8b extends perpendicular to a plane formed by the central axis line X of the driving shaft 6 and the top dead center Dp of the swash plate 8. The link arm 16 connecting the rotor arm 7a and the swash plate arm 8a is arranged. The circular through hole 16a is formed in one end of the link arm 16, and circular through holes 16b and 16c are formed in the other end of the link arm 16 bifurcate. The pair of rotor arms 7a sandwich one end of the link arm 16, and the other end of the link arm 16 bifurcate sandwiches the swash plate arm 8a.

The pin 17 is press-fitted into the circular through hole 8b and both ends of the pin are relatively slidably inserted into the circular through holes 16b and 16c. The pin 18 is press-fitted into the circular through hole 16a, and both ends of the pin are relatively slidably inserted into the circular through holes 7b and 7c. The linkage mechanism 19 is constituted by the rotor arm 7a, the swash plate arm 8a, the link arm 16 and the pins 17 and 18. The linkage mechanism 19 allows the swash plate 8 to vary the tilting angle, and connects the rotor 7 and the swash plate 8 preventing from relative rotation around the driving shaft 6.

The piston 10 reciprocates in the cylinder bore 12a depending on the rotation of the swash plate 8, introduces a gas into the cylinder bore 12a, and compresses the gas in the cylinder bore 12a. In the operation, the tilting angle of the swash plate 8 is controlled by a control system (not shown) which controls a pressure difference between the introduction chamber 20 and the crank chamber 21 by a pressure difference control valve depending on a heat load on an air conditioner.

EXAMPLE

A lubrication paint was prepared by charging 50 wt % of a polyamide imide resin which is a thermosetting resin, 35 wt % of sintered granular polytetrafluoroethylene, 15 wt % of graphite where the blending ratio is based on solid content and an appropriate amount of an organic solvent (N-methyl-2-pyrrolidone) into a ball mill followed by pulverizing and mixing the charged materials for 3 hours. The viscosity measured by rotational Brookfield type viscometer, rotor No. 3, rotation of 6 rpm and 25 deg.-C. of the paint was 8.68 Pa·s/25 deg.-C. Further, the surface of the disk-shaped substrate 1 made of iron based material was degreased followed by roughening by shot blasting to adjust a surface roughness (Rz) 10 micron-meters. The diameter of the disk-shaped substrate 1 is 86 mm and the width of the annular ring of the sliding portion is 15 mm. The disk-shaped substrate 1 was mounted horizontally on a rotating device; and the lubrication paint described above was supplied on the sliding portion of the disk-shaped substrate 1 from a paint supply nozzle 2 described in FIG. 1 to FIG. 3 while rotating the disk-shaped substrate 1 in 60 rpm, and the supplied paint was made level by a doctor knife 3 described in FIG. 1 to FIG. 3. The paint supply nozzle 2 was arranged at a position of a rotation angle of 0 degrees, and the doctor knife 3 was arranged at a position of the rotation angle of 180 degrees. The angle θ(theta)1 of the doctor knife 3 against the disk-shaped substrate 1 was adjusted to 1 degree, the angle θ(theta)2 was adjusted to −0.04 degrees and the angle θ(theta)3 was adjusted to 45 degrees. The paint supply nozzle 2 had two nozzles 2a and 2b; and the nozzle position P1 of the nozzle 2a was 3 mm, the pitch P2 between the nozzles 2a and 2b was 3.76 mm, and the nozzle diameter of both of the nozzles were 2.4 mm. In addition, the amount of the paint supplied from the paint supply nozzle 2 and the rotation of the disk-shaped substrate 1 were adjusted to make the amount of the paint coated 0.022 g/cm$^2$. In the paint coating step, one cycle was finished in every 360° rotation of the disk-shaped substrate 1. After finishing one cycle of the coating step, the doctor knife 3 moved away from the position where the doctor knife was arranged in coating toward XYZ directions at a speed of 1 mm/second to a predetermined stand-by position to stop at the position. The rotation of the disk-shaped substrate 1 in moving away was 60 rpm. By the coating method, the level paint was coated just on the sliding portion 1a without coating on portions other than the sliding portion 1a and/or dripping of the paint. The disk-shaped substrate 1 on which the paint was coated was heated and dried at 230° C. for 30 minutes for curing of the paint film. Then, the cured paint film was polished by a polishing machine, and the surface of the paint film was adjusted to the surface roughness Ra of 0.9 micron-meters.

INDUSTRIAL APPLICABILITY

The method of coating a lubrication paint according to the present invention excludes a masking operation for preventing the paint from coating on portions other than a sliding portion and can efficiently coat the paint just on the sliding portion in coating of the lubrication paint on a disk-shaped substrate such as a swash plate; and the method can provide a paint film having an even film thickness over the entire area of the sliding portion appropriately. So, the present method is industrially useful.

SYMBOL LIST

1: disk-shaped substrate
1a: sliding portion
1b: inner edge of the sliding portion 1a
2, 2a and 2b: paint supply nozzle
3: doctor knife
4: paint supplied from the paint supply nozzle 2
5: paint film made level by the doctor knife 3
6: driving shaft
7: rotor
7a: rotor arm
7b and 7c: circular through hole
8: swash plate
8a: swash plate arm
8b: circular through hole
9: boss of the swash plate
10: shoe
11: piston
12: cylinder block
12a: cylinder bore
13: front housing
14: cylinder head
15: valve plate
16: link arm
16a, 16b and 16c: circular through hole
17: pin
18: pin
19: linkage mechanism
20: introduction chamber
21: crank chamber
O: center point of the disk-shaped substrate 1
P: point where the inner edge 1b of the sliding portion 1a in the disk-shaped substrate 1 cross with the straight line L1
Dp: top dead center of the swash plate 8
L1: straight line formed of the line which intersects plane S1 constituted by edge line of the doctor knife 3 perpendicular to the surface of disk-shaped substrate 1 and the surface of the disk-shaped substrate 1
L2: a straight line connecting the center point O of the disk-shaped substrate 1 and the intersection point P
L3: straight line on the surface of the disk-shaped substrate 1 which passes the intersection point P perpendicular to the straight line L2
L4: straight line formed of the line of which intersects the plane S2 including the straight line L3 and is perpendicular to the disk-shaped substrate 1 and a plane of the doctor knife 3
θ(theta)1: angle formed by the straight line L1 and the straight line L2
θ(theta)2: angle which is the vertical blade angle of doctor knife 3 against the surface of the disk-shaped substrate 1
θ(theta)3: angle formed by the straight line L3 and the straight line L4

The invention claimed is:

1. A method of coating a lubrication paint on a disk-shaped substrate, comprising:
    applying a lubrication paint on a sliding portion of a disk-shaped substrate from a paint supply nozzle while rotating the disk-shaped substrate in the horizontal plane; and
    leveling the lubrication paint applied on the sliding portion by contacting the lubrication paint with a doctor knife arranged at a downstream position in the direction of rotation of the disk-shaped substrate.

2. The method of claim 1, wherein, if a line which intersects a plane including an edge line of the doctor knife and is perpendicular to the surface of disk-shaped substrate and a surface of the disk-shaped substrate is defined as the straight line ($L_1$), and a straight line connecting the center point (O) of the disk-shaped substrate and a point (P) where an inner edge of the sliding portion of the disk-shaped substrate cross the straight line ($L_1$) is defined as the straight line ($L_2$), the angle ($θ_1$) formed by the straight line ($L_1$) and the straight line ($L_2$), is −1° to +15°, wherein a negative angle means that the straight line ($L_1$) is at the upstream side of the rotation of the disk-shaped substrate from the straight line ($L_2$), and wherein a positive angle means that the straight line ($L_1$) is at the downstream side of the rotation of the disk-shaped substrate from the straight line ($L_2$).

3. The method of coating the lubrication paint on the disk-shaped substrate according to claim 2, wherein a vertical angle ($θ_2$), which is the blade angle of the doctor knife (3) against the surface of the disk-shaped substrate, is −1° to +1°, wherein a negative angle means that the edge line of the doctor knife (3) has downward tilt from the inside to the outside of the disk-shaped substrate (1), and wherein a positive angle means that the edge line of the doctor knife (3) has upward tilt from the inside to the outside of the disk-shaped substrate (1).

4. The method of claim 1, wherein a vertical angle ($\theta_2$), which is the blade angle of the doctor knife (3) against the surface of the disk-shaped substrate is −1° to +1°, wherein a negative angle means that the edge line of the doctor knife (3) has downward tilt from the inside to the outside of the disk-shaped substrate (1), and wherein a positive angle means that the edge line of the doctor knife (3) has upward tilt from the inside to the outside of the disk-shaped substrate (1).

5. The method of coating the lubrication paint on the disk-shaped substrate according to claim 4, wherein, if a straight line on the surface of the disk-shaped substrate (1) which passes point (P) where the inner edge of the sliding portion of the disk-shaped substrate crosses with straight line ($L_1$) and perpendicular to the straight line ($L_2$) is defined as the straight line ($L_3$), and a line intersecting a plane including the straight line ($L_3$) and perpendicular to the disk-shaped substrate (1) and the plane of the doctor knife (3) is defined as the straight line ($L_4$), an angle ($\theta_3$) is formed by the straight line $L_3$ and the straight line ($L_4$) and is 25° to 85°.

6. The method of claim 1, wherein if a straight line on the surface of the disk-shaped substrate 1 which passes point (P) where the inner edge of the sliding portion of the disk-shaped substrate crosses with straight line ($L_1$) and perpendicular to straight line ($L_2$) is defined as the straight line ($L_3$), and a line intersecting a plane including the straight line ($L_3$) and perpendicular to the disk-shaped substrate (1) and the plane of the doctor knife (3) is defined as the straight line ($L_4$), an angle ($\theta_3$) is formed by the straight line $L_3$ and the straight line ($L_4$) is 25° to 85°.

7. The method of claim 6, wherein two paint supply nozzles, an outer nozzle and an inner nozzle, are arranged along a radial direction of the disk-shaped substrate, and the position of the outer nozzle is 0.5 mm to 6 mm from the outer edge of the disk-shaped substrate and the pitch between the outer nozzle and the inner nozzle is 0.5 mm to 5 mm.

8. The method of claim 1, wherein an outer nozzle and an inner nozzle are arranged along a radial direction of the disk-shaped substrate, and the position of the outer nozzle if 0.5 mm to 6 mm from the outer edge of the disk-shaped substrate and the pitch between the outer nozzle and the inner nozzle is 0.5 mm to 5 mm.

9. The method of claim 8, wherein the inner diameter of the paint supply nozzle is 0.3 mm to 4 mm.

10. The method of claim 1, wherein the inner diameter of the paint supply nozzle is 0.3 mm to 4 mm.

11. The method of claim 10, wherein the viscosity of the lubrication paint is 1,000 mPa·s at 25° C. to 30,000 mPa·s at 25° C.

12. The method of claim 1, wherein the viscosity of the lubrication paint is 1,000 mPa·s at 25° C. to 30,000 mPa·s at 25° C.

13. The method of claim 12, wherein an amount of the paint coated on the sliding portion of the disk-shaped substrate is 0.006 g/cm$^2$ to 0.038 g/cm$^2$ per unit area of the sliding portion.

14. The method of claim 1, wherein an amount of the paint coated on the sliding portion of the disk-shaped substrate is 0.006 g/cm$^2$ to 0.038 g/cm$^2$ per unit area of the sliding portion.

15. The method of claim 14, wherein,
    after finishing one cycle of the coating step, the doctor knife moves away from a position occupied during coating toward an upper direction, an outside direction and a frontward direction, at a speed of 0.1 mm to 10 mm/second; and
    a rotation of the disk-shaped substrate during the moving away of the doctor knife is 10 rpm to 200 rpm.

16. The method of claim 1, wherein,
    after finishing one cycle of the coating step, the doctor knife moves away from a position occupied during coating toward an upper direction, an outside direction, and a frontward direction, at a speed of 0.1 mm to 10 mm/second; and
    a rotation of the disk-shaped substrate during the moving away of the doctor knife is 10 rpm to 200 rpm.

17. The method of claim 16, wherein the disk-shaped substrate is a swash plate of a swash-plate compressor which slides a shoe on the swash plate and converts a rotation of the swash plate into a reciprocating movement of a piston through the shoe to compress a coolant.

18. The method of claim 1, wherein the disk-shaped substrate is a swash plate of a swash-plate compressor which slides a shoe on the swash plate and converts a rotation of the swash plate into a reciprocating movement of a piston through the shoe to compress a coolant.

\* \* \* \* \*